United States Patent
MacConnell et al.

(10) Patent No.: US 6,275,164 B1
(45) Date of Patent: Aug. 14, 2001

(54) EMERGENCY LOCATOR SYSTEM

(76) Inventors: John W. MacConnell, 2612 N. Pines Rd., #C30, Spokane, WA (US) 99206; Richard W. D. Booth, 237 San Mateo, Los Gatos, CA (US) 95030

(*) Notice: Subject to any disclaimer, the term of this patent is extended or adjusted under 35 U.S.C. 154(b) by 0 days.

(21) Appl. No.: 09/210,500

(22) Filed: Dec. 11, 1998

(51) Int. Cl.[7] .................................................. G08B 25/08
(52) U.S. Cl. ...................... 340/692; 340/989; 340/573.1; 342/457; 342/385
(58) Field of Search .................................... 340/692, 989, 340/988, 573.1, 573.4; 342/457, 386, 385, 454, 98, 357; 379/38

(56) References Cited

U.S. PATENT DOCUMENTS

| | | | |
|---|---|---|---|
| 3,176,229 | 3/1965 | Pierce | 325/105 |
| 3,613,085 | 10/1971 | Winskell | 340/172.5 |
| 3,790,948 | 2/1974 | Ratkovich | 343/113 R |
| 4,394,777 | * 7/1983 | Wren | 455/55 |
| 4,630,289 | * 12/1986 | Wren | 340/981 |
| 4,888,595 | 12/1989 | Friedman | 342/457 |
| 5,024,447 | 6/1991 | Jude | 273/416 |
| 5,157,405 | 10/1992 | Wycoff et al. | 342/386 |
| 5,367,306 | 11/1994 | Hollon et al. | 342/386 |
| 5,389,935 | * 2/1995 | Drouault et al. | 342/457 |
| 5,515,061 | 5/1996 | Hiltz et al. | 342/385 |
| 5,515,419 | * 5/1996 | Sheffer | 379/58 |
| 5,555,286 | * 9/1996 | Tendler | 379/59 |
| 5,563,612 | 10/1996 | Flood et al. | 342/385 |
| 5,726,663 | 3/1998 | Moyer et al. | 342/419 |
| 5,731,785 | 3/1998 | Lemelson et al. | 342/357 |
| 5,742,233 | * 4/1998 | Hoffman et al. | 340/573 |
| 5,742,666 | * 4/1998 | Alpert | 340/990 |
| 5,914,675 | * 6/1999 | Tognazzini | 340/989 |
| 5,974,031 | * 10/1999 | Kwan et al. | 370/252 |
| 6,052,052 | * 4/2000 | Delmonaco | 340/539 |

OTHER PUBLICATIONS

U.S. Statutory Invention Registration No. H1560, "Crash Site Locator Beacon," by Gill et al., Published on Jul. 2, 1996.

* cited by examiner

Primary Examiner—Daniel J. Wu
Assistant Examiner—Anh La
(74) Attorney, Agent, or Firm—Dicke, Billig & Czaja, P.A.

(57) ABSTRACT

A low-cost emergency locator beacon (ELB) device that transmits an identifying serial number in addition to the beacon signal. This transmission includes an audio modulated Manchester encoded digital version of the serial number, and an analog, voice synthesized version of the serial number. In one embodiment, the device incorporates a receiver that enables the user of the device to enter into two-way, direct voice communication with a rescuer. The device also includes an automatic receive function which facilitates operation of the device by users not aware or not able to operate the device. In another embodiment, the ELB device includes an inhibit function which prevents non-emergency, ELB device to ELB device communication. In yet another embodiment, the present device incorporates a global positioning system (GPS) receiver which reads, processes and stores positioning information broadcast by GPS satellites, then broadcasts the GPS position information in conjunction with the beacon signal and identifying serial number.

40 Claims, 4 Drawing Sheets

EMERGENCY LOCATOR SYSTEM

THE FIELD OF THE INVENTION

The present invention relates to emergency locator beacons, and, more particularly to an enhanced locator beacon apparatus having a bi-directional communication capability, which broadcasts a identifying serial number in addition to the beacon signal.

BACKGROUND OF THE INVENTION

Emergency Locator Beacons (ELB) are devices designed to be used as a last resort for people in life threatening situations. Every day there are many examples, some ending tragically, where possession of an ELB would have in the least saved much suffering, and quite often saved a life. The increased use of emergency locator beacon devices also saves the government much time and expense searching for missing persons.

Emergency locator beacons are best utilized in situations where individuals are: injured or lost in the wilderness (i.e., hikers, mountaineers, and skiers), lost or in distress at sea, or involved in an aircraft crash. Conventional emergency locator beacons are not designed for "minor emergencies", such as running out of gas or seeking aid for a flat tire. Typical emergency locator beacon devices are small, approximately the size of a cellular phone. Conventional emergency locator beacon devices typically utilize lithium batteries, which yield at least a five year shelf-life with enough capacity remaining to allow 24 hours of continuous operation.

There are currently two basic types of emergency locator beacons in use. The simplest types of units typically simultaneously transmit on 121.5 MHz and 243 MHz. Emergency locator beacons of this type are required to be carried by all commercial aircraft, all private aircraft registered in the United States and some other countries, and are also a requirement aboard commercial ships.

When an aircraft crashes, an acceleration sensor in the device turns an emergency locator beacon device on. The emergency locator beacon transmits an amplitude modulated downward sweeping tone somewhere in the audio frequency range of 1,600 Hz to 300 Hz with a minimum sweep range of 700 Hz, and a sweep rate of from 2 to 4 sweeps per second. The output power is greater than 75 mw. No other information is broadcast other than the sweeping tone. The same type of beacon is used on boats and ships. The difference is that these types of emergency locator beacon are waterproof, float, and are typically either manually or water activated, rather than impact operated as in the aircraft units.

Detection of the emergency locator beam signal is typically made through satellite or aircraft. There are two varieties of satellites that detect the emergency locator beam signals, one called COSPAS, the other SARSAT. The COSPAS system was the first in operation, and was built by the Soviets. The SARSAT system was developed by NASA, and is operated by NOAA.

Satellites process the 121.5/243 MHz signals in a "bent pipe" fashion. That is, if the satellite hears the beacon, it relays the signal in real time. Therefore, for a ground station to hear the beacon, the satellite must be in a position where it is simultaneously visible to both the ground station and the beacon. It typically takes two satellite passes before a location can be determined. It can take up to two hours before a satellite hears a beacon, and often six or more hours before its position can be triangulated. The location accuracy is on the order of ten miles, versus 1 mile for the more technically advanced 406 MHz digital emergency locator beam units.

All commercial aircraft have a dedicated "guard" receiver that continuously monitors the 121.5 MHz and 243 MHz frequencies. Private aircraft operators are also encouraged to periodically monitor the 121.5 MHz channel while in flight. Therefore, there are a large number of additional monitoring "platforms" available to track emergency beacons, in addition to the satellites.

One difficulty with the 121.5/243 MHz units is a high false alarm rate, which approaches 98 percent. Unfortunately, when an emergency locator beacon unit is activated, there is no information transmitted, other than the sweeping tone, indicating that there may be an emergency. The search and rescue organizations must track down each unit, which is an expensive and time consuming process. The process of determining if an alarm is false can delay rescue in actual emergency situations.

As mentioned above, the second, more technically sophisticated type of emergency locator beacon, operates on a frequency of 406 MHz. Unfortunately, the 406 MHz units, while technically superior, are also much more expensive (typically over $1,000 to around $1,500 vs. approximately $100–$200 for the 121.5/243 MHz units). These 406 MHz emergency locator beacon units offer several advantages over the 121.5/243 MHz emergency locator beacon units. First, the 406 MHz emergency locator beacon units have improved location accuracy due to improved accuracy of the transmitted frequency.

Another advantage of the 406 MHz emergency locator beacon units is improved system capacity. Unlike the 121.5/243 MHz units which broadcast continuously, the 406 MHz emergency locator beacon units transmit a half second burst every fifty seconds. Thus, the 406 MHz emergency locator beacon units are "on the air" a small fraction of the time, making more time available for other beacons.

The 406 MHz emergency locator beacons also offer an improved probability of detection due to higher power. These devices broadcast with 5 watts of power compared to approximately 0.1 watt for the 121.5/243 MHz beacons. However, this difference is not as great as it first appears due to the increased path-loss incurred at the higher frequency. To achieve equivalent free space performance at 121.5 MHz, it is necessary to operate with a power of 0.45 watts. The free space range difference between a 5 watt transmitter operating at 406 MHz, and a 0.1 watt transmitter operating at 121.5 MHz, assuming equal antenna gains and receiver sensitivities at the end of each link is about 2.1:1.

Another advantage to the 406 MHz emergency locator beacons is a lower average power drain because of the lower duty cycle. The average output power of a 121.5 MHz beacon operating at 100 mw is 100 mw. The average output power of a 5 watt beacon operating at a 1 percent duty cycle is 50 mw. The high peak power requirements of the 406 MHz emergency locator beacons require either a special battery, or the use of other techniques to handle the high power peaks. These "other techniques" tend to reduce the efficiency of the device, resulting in a higher average power. Additionally, because it is virtually impossible to use a direction finder to home in on a device with such a lower duty cycle, 406 MHz beacons typically also contain a 121.5 MHz transmitter operating at around 20 mw output to assist in precisely locating the beacon during a rescue. The combination of the lower power efficiency and the use of the secondary beacon minimize any advantage gained due to the lower duty cycle.

The 406 MHz emergency locator beacons also offer better coverage than the 121.5/243 MHz emergency locator beacons, because the 406 MHz emergency locator beacons operate in a store-and-forward mode, rather than a bent-pipe mode. The satellites can hear a 406 MHz emergency locator beacon anywhere, store the location, and deliver the data when in view of a ground station. As mentioned earlier, to relay a 121.5 MHz beacon, the satellite must be mutually in view of the ground station and the emergency locator beacon. This results in areas of the globe where there is no coverage, or situations where there is an increased time until a satellite is in a favorable position.

Finally, the 406 MHz emergency locator beacons allow a unique identification of each emergency locator beacon unit. Each 406 MHz emergency locator beacon transmits a unique digital identification number. This number is correlated to an individual. This greatly assists in handling false alarms (the current reported false alarm rate at 406 MHz is 90 percent). The unique identification number also aids in understanding the situation the individual may be in (or if the alarm is false) because the rescue organization can immediately attempt to contact the beacon's owner for contact during an emergency. This enables the rescue organization to gain additional information, such as where the person is, and what they were doing.

In summary, known emergency locator beacons have very high false alarm rates and/or may be prohibitively expensive. The aforementioned systems do not lend themselves to easy identification of the owner of the device. Further it is desirable to have an emergency locator beacon with enhanced communication features.

SUMMARY OF THE INVENTION

The present invention provides an emergency locator beacon (ELB) device having a memory, where the memory contains a unit identification. A controller coupled to the memory controls the operation of the ELB device. The ELB device further includes a voice synthesizer coupled to the controller which translates the unit identification stored in the memory into a voice unit identification message. The ELB device also contains an ELB antenna. Finally, the ELB device includes a transmitter coupled to the controller and the voice synthesizer selectively broadcasts a locator beam signal, an audio modulated, digital version of the unit identification, and the voice identification message via the ELB antenna.

The ELB device of the present invention is capable of transmitting simultaneously on more than one frequency. In a preferred embodiment, the ELB device broadcasts on the 121.5 MHz and 243 MHz frequencies. In one embodiment of the present invention, the memory is a programmable read-only memory (PROM). In an alternate embodiment of the present invention, the memory is an erasable programmable read-only memory (EPROM). The selective broadcast identified in the preceding paragraph includes a plurality of repeatable cycles. Each of the repeatable cycles includes transmission of the locator beam signal for a predetermined time, followed by a transmission of the audio modulated digital version of the unit identification, followed by a transmission of the voice unit identification message.

In one embodiment of the present invention, the ELB device also includes a receiver coupled to the controller and the ELB antenna, which, in conjunction with the transmitter, provides a two way voice communication capability between the ELB device and a remote transceiver, via the ELB antenna. The ELB device also incorporates a microphone coupled to the transmitter which enables a user of the ELB device to send an outgoing message by activating a push-to-talk button. A speaker, coupled to the receiver, enables the user of the ELB device to listen to an incoming voice message.

In another embodiment of the present invention, the ELB device further includes a global positioning system (GPS) antenna/receiver, which enables the reception and processing of GPS satellite information, and a non-volatile memory which stores positioning information received from the GPS antenna/receiver. This stored positioning information is transmitted both digitally and by voice to a remote receiver upon activation of the ELB device.

In yet another embodiment of the present invention, the ELB device further includes an inhibit signal generator coupled to the controller and the transmitter which generates a sub-audible tone. This sub-audible tone inhibits ELB device to ELB device direct communication.

The present invention also discloses a method for transmitting an ELB signal from an originating ELB device to a remote receiver. This transmission includes a locator beam signal and unit identification information. The transmission further includes a two-way voice communication between the ELB device and the remote receiver.

The method begins by activating the originating ELB device. Next, the unit identification is read from a memory and, the ELB device translates the unit identification from the memory into an audio modulated digital version of the unit identification via a CPU, and translates the unit identification from the memory into a voice unit identification message via a voice synthesizer. Following the translation step, the ELB device then transmits the ELB signal, the audio modulated digital version of the unit identification, and the voice unit identification message to the remote receiver in a continuous, cyclic manner via a transceiver. Next, the transceiver within the ELB device switches to a receive mode for a predetermined period of time. During the receive mode, an operator at a remote receiver can transmit a voice message to the ELB device, and a user of the ELB device can respond to the operator by activating a push-to-talk button on the ELB device.

In this method, activating the push-to-talk button during the receive mode extends the time length of the receive mode between transmission cycles. The method described above may include an additional step where an inhibit signal (for example, a 20 Hz sub-audible tone) is broadcast by the ELB device in order to inhibit ELB device to ELB device communication. In other embodiments of the present invention, the inhibit signal may be broadcast on tone frequencies other than 20 Hz. In an alternative embodiment, a digital word may be used instead of a tone in order to inhibit ELB device to ELB device communications.

The method may also contain additional steps wherein the ELB device receives a plurality of global positioning system (GPS) signals from multiple GPS satellites via a GPS receiver incorporated within the ELB device, processes the plurality of GPS signals, generates a positional identifier, and sends both an audio modulated digital version of the positional identifier, and a voice synthesized translation of the positional identifier to a remote receiver via the transceiver.

The ELB device of the present invention provides several key advantages over ELB devices currently in use. While the 121.5/243 MHz ELB devices currently in use only transmit a sweeping beacon tone, the ELB device of the present invention transmits a unit identification number, both vocally and digitally, in addition to the conventional sweeping beacon tone. This unit identification number reduces false alarms, identifies the user of the ELB devices, and aids rescuers in understanding the situation the user of the ELB device might be in. The present invention also incorporates a two-way communications capability with an automatic receive function which is not currently available in current 121.5/243 MHz devices. The incorporation of a receiver in addition to the standard transmitter within the ELB device enables a user of the ELB device to directly carry on a conversation with a rescuer. The automatic receive function automates the mode switching of the device between transmit and receive on a cyclical basis, thus allowing a user not familiar with the use of the ELB device to operate it successfully. The present invention also provides a unique inhibit function which prevents usage of the device in non-emergency situations (no ELB device to ELB device direct communication). One embodiment of the present invention integrates a GPS receiver into the ELB device, thus enabling the ELB device to transmit precise locational information to a rescuer through the ELB device. While expensive 406 MHz ELB devices currently in use provide enhanced functionality over conventional 121.5/243 MHz ELB devices, the present invention provides a level of functionality superior to the 406 MHz devices at a fraction of the cost.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
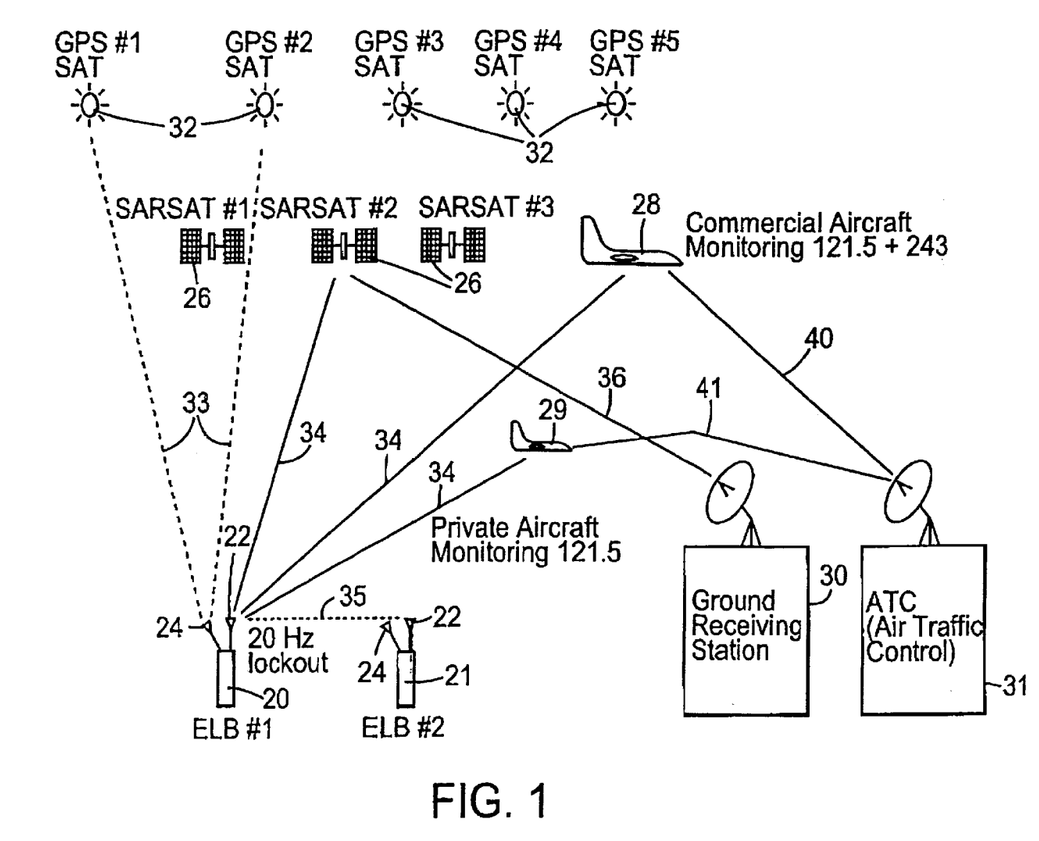
FIG. 1 is an illustration of an operational environment in which an emergency location beacon (ELB) in accordance with the present invention operates.

FIG. 1 is an illustration of an environment in which an emergency location beacon (ELB) device 20 of the present invention operates. ELB device 20 is activated by an external stimulus, such as: impact (as in the case of an aircraft crash), water (as in the case of a distressed ship), or by a user activating a switch. ELB device 20 of the present invention is able to send an emergency beacon transmission 34 via antenna 22 over more than one frequency. In a preferred embodiment, two emergency frequencies (a 121.5 MHz civilian frequency and a 243 MHz-military frequency) are used. Emergency beacon transmission 34 is detectable by ELB devices. For example, ELB satellites 26, aircraft 28 and 29, ships (not shown), or other ground stations (not shown) are capable of detecting emergency beacon transmission 34. Presently, there are 6 orbiting ELB satellites 26 (3 American SARSAT and 3 Russian COSPAS) that are capable of receiving emergency beacon transmissions 34 from ELB device 20. ELB satellites 26 process emergency beacon transmissions 34 in a "bent pipe" fashion. Thus, if ELB satellite 26 hears emergency beacon transmission 34, it relays emergency beacon transmission 34 to a ground station 30 via transmission signal path 36. In order for ground station 30 to hear emergency beacon transmission 34, ELB satellite 26 must be in a position where it is visible to both ELB device 20 and ground station 30.

Emergency beacon transmission 34 is also capable of being detected by aircraft 28 and 29 travelling in range of the beacon. All commercial aircraft 28 have a dedicated "guard" receiver that continuously monitors for emergency beacon transmissions 34 over the 121.5 MHz and 243 MHz frequencies. Private aircraft 29 are also encouraged to monitor the 121.5 MHz frequency for emergency beacon transmissions 34 while in flight. In the case of both commercial and private aircraft 28 and 29, if emergency beacon transmission 34 is detected, aircraft 28 and 29 relay general location information of where the emergency beacon transmission originates to an air traffic control (ATC) center 31 via transmission signal paths 40 and 41, respectively. The ATC center then relays its findings onto the proper rescue authorities.

Unlike conventional ELB devices, which transmit only a sweeping tone on the 121.5 and 243 frequencies, the ELB device 20 of the present invention broadcasts an identifying serial number for the ELB device 20 in addition to the conventional sweeping tone. This identifying serial number is transmitted two ways. First, a voice synthesizer built into ELB device 20 translates the identifying serial number from a digital format to an analog format. The analog, voice synthesized serial number is then broadcast by voice transmission, as further described in FIG. 2. Secondly, the serial number is broadcast by an audio modulated Manchester encoded digital version of the serial number, also described in more detail in FIG. 2. In alternative embodiments, other encoding methods may be used, such as Non-Return to Zero (NRZ) or Dual Tone Multi-Frequency (DTMF). In both instances, listeners in aircraft 28 and 29 or on the ground can receive the identifying serial number and pass it along to search and rescue (SAR) groups.

Another key advantage to ELB device 20 of the present invention over conventional ELB devices, is that in one embodiment of the present invention, ELB device 20 enables direct, two-way communication between the person operating ELB device 20 on the ground, and a rescuer receiving the ELB transmission at a remote location. While the vast majority of conventional ELB devices only contain a transmitter, ELB device 20 of the present invention can also include a receiver. An ELB device 20 of the present invention may also incorporate the capability to automatically switch between transmit and receive modes of operation in a cyclic manner, as further described in FIG. 3. This is an important feature for individuals unaware of the capabilities of ELB device 20, or unable to operate ELB device 20.

In another embodiment of the present invention, ELB device 20 incorporates a global positioning system (GPS) receiver 74. GPS receiver 74 converts signals 33 received from a plurality of GPS satellites 32 into a precise location. This GPS location information is then transmitted, both vocally and digitally, to ELB satellites 26, commercial aircraft 28 and private aircraft 29 via transmission path 34. Once ELB satellites 26, commercial aircraft 28 and private aircraft 29 receive the GPS location information, they re-transmit the GPS location information to ground receiving station via transmission signal paths 36, 40 and 41, respectively.

Another embodiment of the present invention, ELB device 20 also incorporates a feature to inhibit the use of ELB device 20 for anything other than emergency purposes. Since ELB device 20 is a low cost transceiver having a very long range, there is a likelihood of some individuals using ELB device 20 in non-emergency situations, such as ELB device 20 to ELB device 21 two-way communications. To counter this, when a push-to-talk button on the ELB device is depressed thus allowing an individual to speak, a sub-audible tone is also transmitted, as illustrated at 35. In a preferred embodiment of the present invention, the sub-audible tone is broadcast at 20 Hz. However, other broadcast frequencies for the sub-audible tone are supported within the present invention. In an alternative embodiment, the sub-audible tone may be replaced with a digital word.

When a second, similar ELB device 21 detects the inhibit signal sent by the first ELB device 20, second ELB device 21 inhibits the audio within the second ELB device. Aircraft 28 and 29 and ELB satellites 26 do not have the inhibit function, so they will be able to hear the individual's voice, and two-way communications can proceed.

Figure 2:
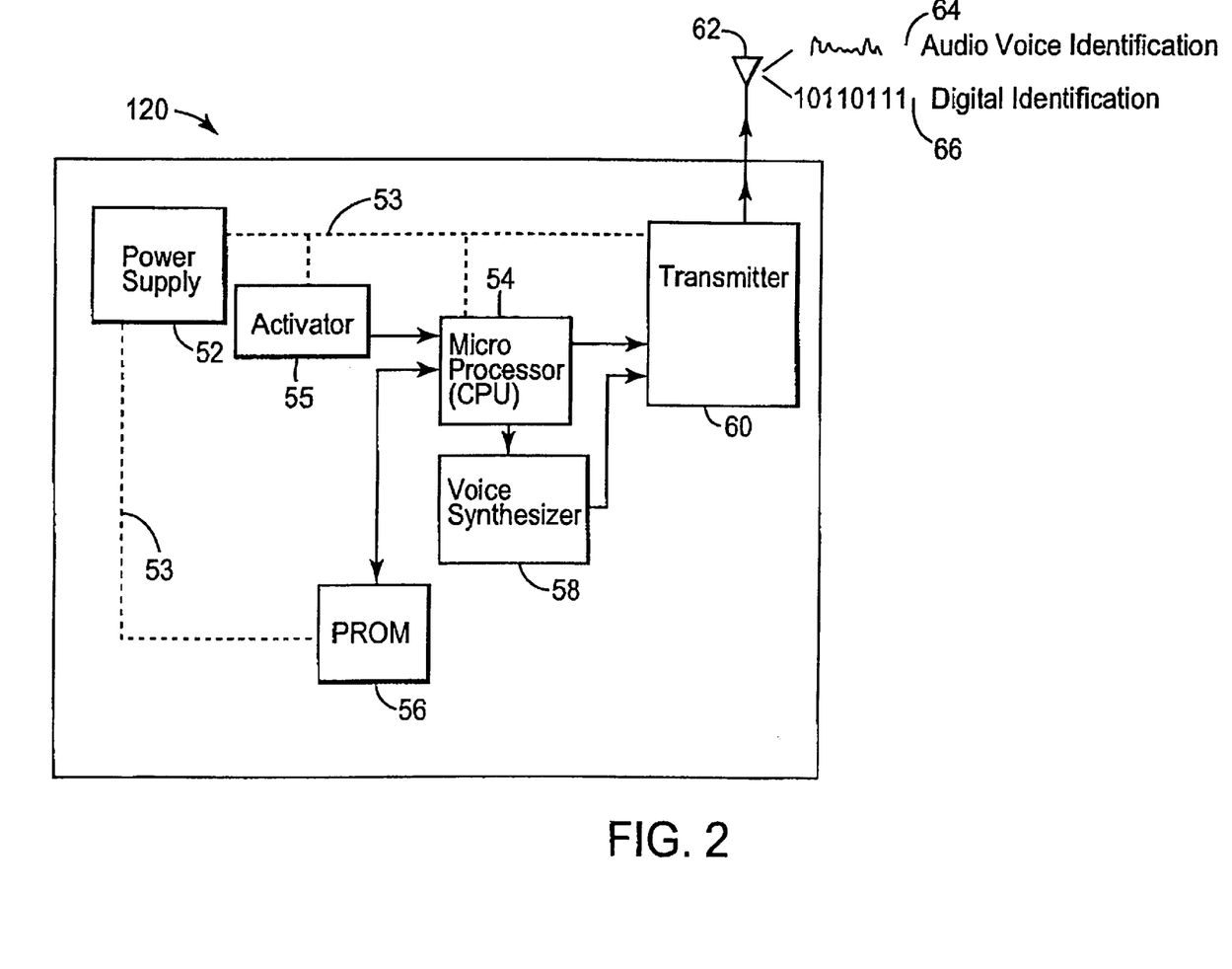
FIG. 2 is a functional block diagram of a low cost ELB embodiment of the present invention.

FIG. 2 is a functional block diagram of a low cost ELB embodiment of the present invention. In the illustrated embodiment, ELB device 120 is powered by an integral power supply 52, indicated at dashed lines 53. In a preferred embodiment, integral power supply 52 is one or more lithium batteries, which yield at least a five-year shelf life with enough capacity remaining to allow approximately 24 hours of continuous operation. ELB device 120 includes an activator 55 for enabling the device. Activator 55 can be activated in a variety of ways, including impact, water and user control.

ELB device 120 also includes memory 56, electrically coupled to controller 54. Preferably, memory 56 comprises a non-volatile memory and, in one preferred embodiment, is a programmable read only memory (PROM). In an alternate embodiment, memory 56 is an erasable programmable read only memory (EPROM). Stored within memory 56 is an identification serial number, unique to ELB device 120. The identification serial number can have many forms. It can be a numeric value that is correlated to an individual via a database. It can also be, for example, an aircraft's tail number, or a ship's identification. This identifying serial number greatly assists in handling false alarms (the current reported false alarm rate for prior art devices is around 98%). The unique identification number also aids in understanding the situation the individual may be in (or if the alarm is false) since the rescue organization can immediately attempt to contact the ELB device's 120 owner or persons alternately designated by the ELB device's 120 owner for contact during an emergency. This enables the rescue organization to gain additional information, such as where the person is, and what they were doing.

ELB device 120 also contains a voice synthesizer 58. In one embodiment, voice synthesizer 58 can be any of a number of commercially available voice synthesizer chips. In an alternative embodiment, the voice can also be programmed directly into PROM memory 56, as stored sample data. In this alternative embodiment, the voice stored in PROM memory 56 is played back at 6,000 samples per second. Playback at rates other than 6,000 samples per second is possible. Voice synthesizer 58 translates the digitally encoded identification serial number stored in memory 56 into an analog voice identification message, which is transmitted along with the emergency locator beacon signal. As an example, the voice identification message can announce "Serial Number 01123456" or "Aircraft N2198U" or "Motor Ship Aloha".

A transmitter 60, residing within ELB device 120, transmits a sweeping tone for a predetermined period of time, followed by the audio modulated digital version of the serial number 66 (e.g., an audio modulated Manchester encoded digital number) followed by the analog voice identification message 64. The three-part transmission cycle described above is repeated indefinitely, until the device is turned off or runs out of power. The transmitter includes an antenna 62 for aiding in the transmission.

ELB device 120 has a controller 54 for controlling the internal operation of the device. In a preferred embodiment, controller 54 is a Microchip Technologies PIC16C54 type processor. Similar controllers 54 from other commercial manufacturers may also be used within the present invention. Controller 54 may include a central processing unit (CPU), a microprocessor, a computer, and/or any other device capable of performing a sequence of logical operations. Controller 54 is electrically coupled to memory 56, voice synthesizer 58, and transmitter 60 functional units, and coordinates the flow of information between these functional units.

Figure 3:
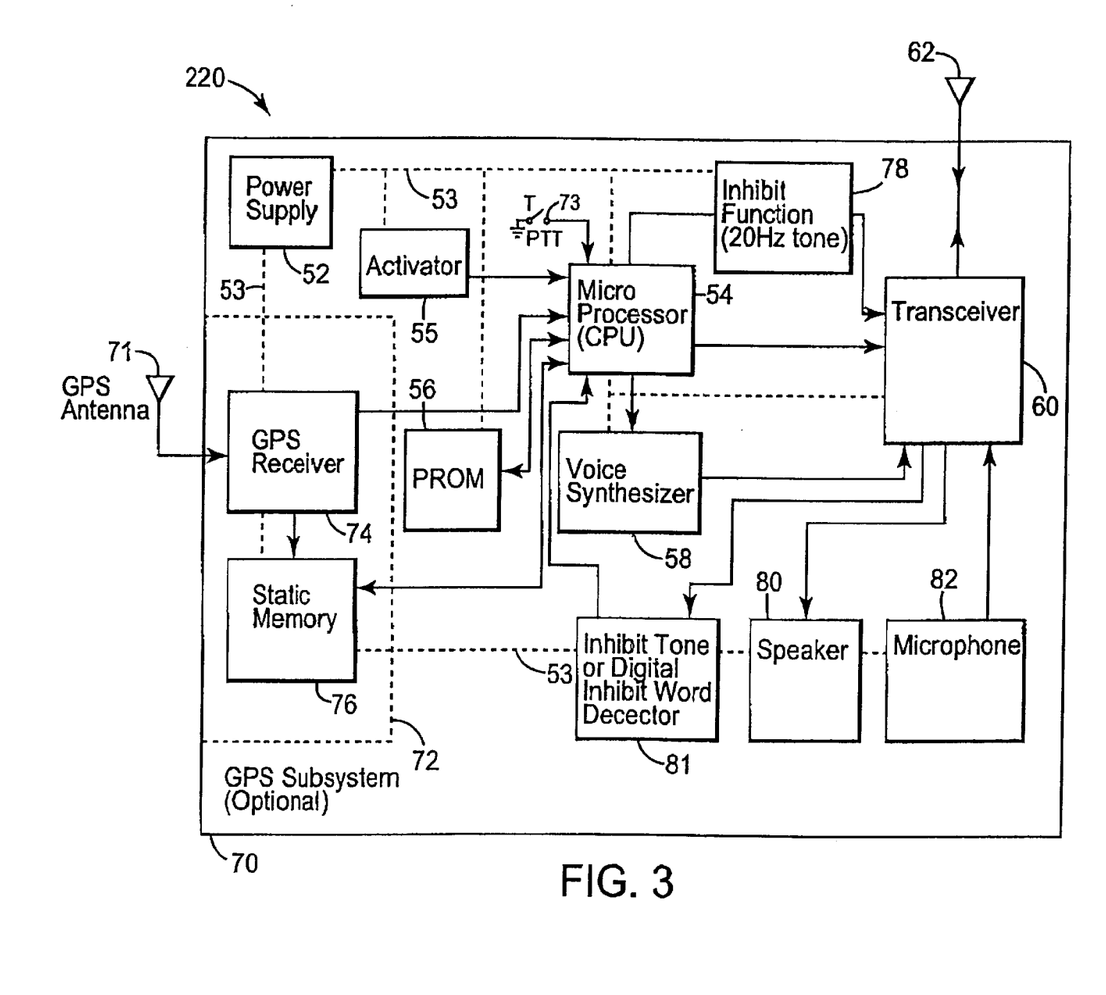
FIG. 3 is a functional block diagram of a high function ELB embodiment of the present invention.

FIG. 3 is a functional block diagram of a high function ELB 220 embodiment of the present invention. This embodiment also contains power supply 52, activator 55, memory 56, voice synthesizer 58, and controller 54, as previously described in FIG. 2.

The illustrated embodiment also includes a GPS subsystem 72. GPS subsystem 72 includes a GPS receiver 74, GPS antenna 71, and static memory 76. The GPS receiver/antenna combination 74 and 71, respectively, continuously receives and processes positioning information broadcast by GPS satellites (FIG. 1, element 32) in order to obtain a position of the ELB device. This positioning information is stored in a non-volatile memory 76 on a regular time interval, along with associated time stamp information. If ELB device 220 is activated, the latest positioning information stored in static memory 76 and its associated time stamp is retrieved by controller 54 and transmitted to a remote receiver via antenna 60. The GPS positioning information can be broadcast by an audio modulated Manchester encoded digital transmission, and/or by a voice message generated by voice synthesizer 58 of the ELB device 220.

ELB device 220 also includes a transceiver 60. Unlike the low cost ELB device 120 illustrated in FIG. 2, ELB device 220 is capable of a direct two-way communications capability. That is, ELB device 220 includes a receiver in addition to a transmitter, thus enabling a user of ELB device to carry on a conversation with a rescuer. A push-to-talk pushbutton 73, speaker 80, and microphone 82 are also included within ELB device 220 to enable the two-way communications capability.

In one embodiment, the operation of ELB device 220 is automated to facilitate operation by those not aware or not able to operate it. This is done through the incorporation of an automatic receive function within ELB device 220. This automatic receive function operates as follows: ELB device 220 transmits the traditional sweeping beacon tone for a predefined length of time (e.g., 20 seconds). Next, ELB device 220 transmits the Manchester encoded digital version of the serial number. ELB device 220 next transmits the voice message containing the serial number. Following the digital transmission, ELB device 20 next transmits a voice message, such as "Please call me now, I will now listen" followed by a short beep indicating that ELB device 220 is switching from transmit mode to receive mode. After this message, ELB device 220 automatically turns off the transmitter, and turns on the receiver for a predetermined time period (e.g., 5 seconds). If the operator does nothing, after the predetermined receive time interval has passed, the device once again begins the cycle by transmitting a sweeping tone.

In one embodiment of the present invention, during the transmission of the sweeping tone, the digital serial number, and the voice serial number, speaker 80 is enabled. In this way, the operator can hear exactly what is being transmitted by ELB device 220. This has two benefits: it allows the operator to know that ELB device 220 is operating property; and it should reduce false alarms since the operator is provided with an audible indication that the ELB device is on when it should not be on.

If, for example, an airliner hears the beacon, the crew of the aircraft can directly call ELB device 220 since standard aircraft radios operate on the 121.5 MHz frequency of ELB device 220. When the user of ELB device 220 hears a rescuer responding to the ELB distress signal, the user of ELB device 220 can respond to the rescuer by depressing push-to-talk button 73. If push-to-talk button 73 is depressed while ELB device 220 is already in the receive mode, the amount of time ELB device 220 stays in the receive mode is automatically extended for a longer period of time (e.g., 30 seconds) before resuming the next transmission cycle. This allows adequate time to receive information from the rescuer. Each time push-to-talk button 73 is depressed and released, the receive mode is automatically extended for a longer period of time. If push-to-talk button 73 is not depressed for a period of time exceeding the 30 second timeout, ELB device 40 then resumes the normal transmit cycle. Depressing the push-to-talk button 73 during the normal transmission cycle interrupts the normal transmission cycle, allowing the user to transmit a message to the rescuer. The ELB device 220 is then placed in the receive mode for a pre-determined time period. In an alternate embodiment of the present invention, push-to-talk button may be substituted with a voice operated switch (VOX).

ELB device 220 can also include an inhibit signal generator 78. Since ELB device 220 is a relatively low cost transceiver capable of operating over a very long range, there is a possibility that individuals may be tempted to use ELB devices 220 for other than emergency purposes. To prevent this, when push-to-talk button 73 is depressed allowing the individual to speak, a sub-audible tone (currently 20 Hz) is generated by the inhibit signal generator 78 and transmitted via transceiver/antenna 60 and 62. When an inhibit signal detector 81 in a similar ELB device detects the 20 Hz tone, the inhibit signal detector 81 alerts the microprocessor 54 which in turn sends a command to transceiver 60 disabling audio to speaker 80. Alternatively the inhibit signal detector 81 is fed directly back to transceiver 60, directly inhibiting the audio. Thus, inhibit signal generator 78 and inhibit signal detector 81 prevent direct ELB device to ELB device communications. Aircraft and satellite radios do not incorporate the inhibit signal detector 81, so they will be able to hear the persons voice, and communication can proceed.

Figure 4:
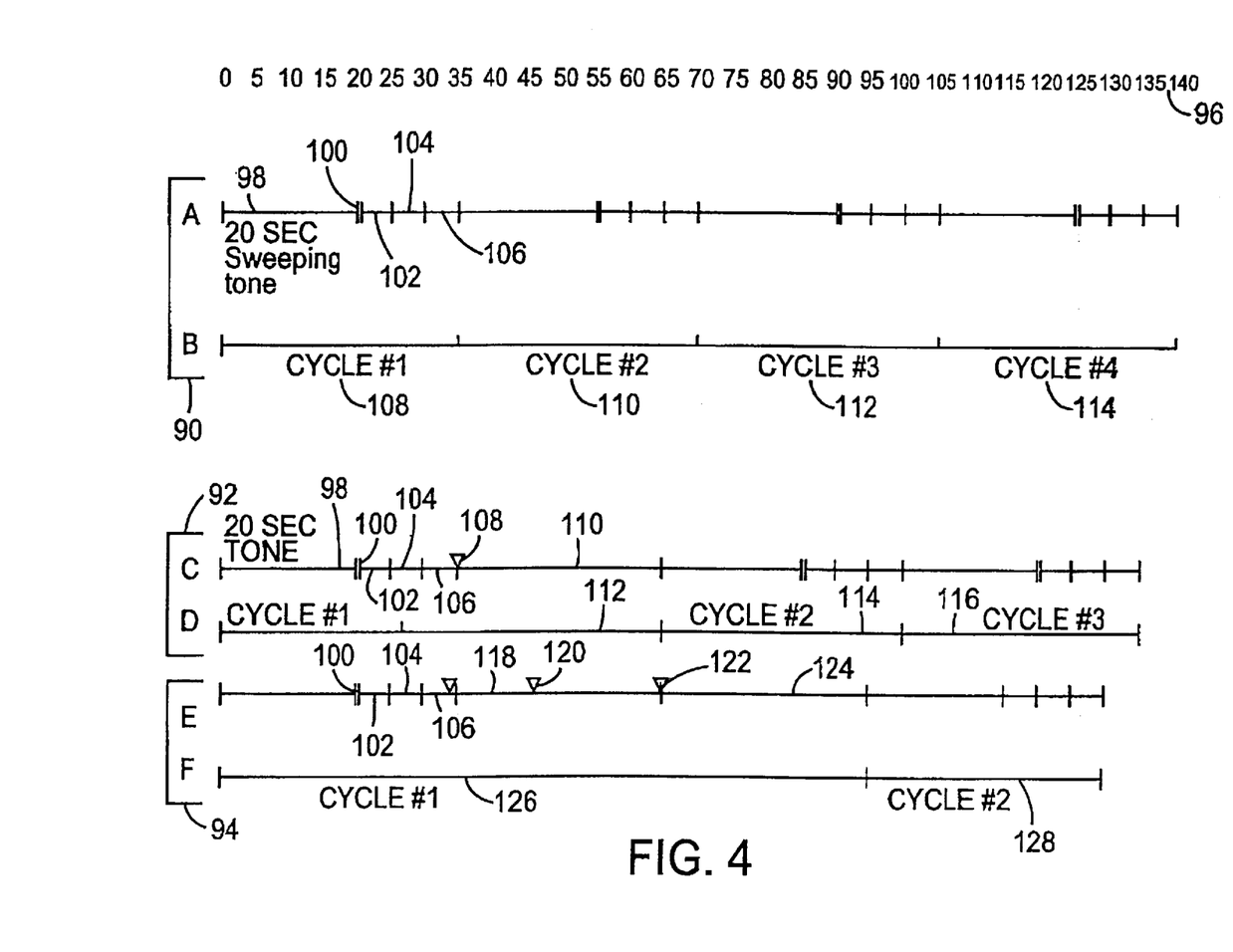
FIG. 4 is a time line illustration of example transmit/receive cycles for the ELB device of the present invention.

FIG. 4 is a time line illustration of three example transmit/receive scenarios 90, 92 and 94 for ELB device (FIG. 3, element 220) of the present invention. In these exemplary embodiments, it is recognized the time intervals or command sequences may vary as determined by one skilled in the art after reading the disclosure of the present invention. The first scenario 90 illustrates the operation of the ELB device (FIG. 3, element 220) where the ELB device is transmitting, but a potential rescuer has not yet detected the ELB transmission. In the first scenario, illustrated at 90, the first transmit/receive cycle 108 begins by the transmission of a sweeping tone from ELB device (FIG. 3, element 220) for a period of approximately 20 seconds. In one preferred embodiment, this transmission is an amplitude modulated downward sweeping tone 98 somewhere in the audio frequency range of 1600 Hz to 300 Hz with a minimum sweep range of 700 Hz, and a sweep rate of 2 to 4 sweeps per second. Upon the completion of the transmission of the sweeping tone 98 at time 20, ELB device (FIG. 3, element 220) next transmits a Manchester encoded digital version of the serial number of ELB device (FIG. 3, element 220) for approximately 0.1 seconds, as illustrated at 100. Next, at approximately time 20.1 seconds, ELB device (FIG. 3, element 220) transmits a voice identification message of the unit's serial number for approximately 5 seconds, as shown at 102. For example, the voice identification message could announce "Serial Number 01123456", or "Aircraft N2198U", or "Motor Ship Aloha". Upon completion of the transmission of the voice identification message at approximately time 25 seconds, ELB device (FIG. 3, element 220) next broadcasts a message for approximately 5 seconds announcing to rescuers that the ELB device is switching from transmit mode to receive mode, as illustrated at 104. Following the receive mode voice announcement 104, the ELB device (FIG. 3, element 220) switches from transmit to receive mode for approximately 5 seconds, beginning at time 30 seconds, as shown at 106. During the time interval ELB device (FIG. 3, element 220) is in receive mode, a rescuer can transmit a message to the user of the ELB device, and the user of the ELB device may respond to the rescuer by activating the push-to-talk button (FIG. 3, element 73) on the ELB device. If the user of ELB device (FIG. 3, element 220) does not activate push-to-talk button (FIG. 3, element 73) while the receive mode is active (as illustrated at 90), the first transmit/receive cycle 108 ends after the receive mode ends, at approximately time 35.

The second transmit/receive cycle 110 begins at approximately time 35. Once again, if the user of ELB device (FIG. 3, element 220) does not activate push-to-talk button (FIG. 3, element 73) during second receive cycle 110, second transmit/receive cycle 110 ends at time 70. Cycles 3 and 4, illustrated at 112 and 114, respectively, are identical to cycles 1 and 2, having a 35 second cycle time. Once again, in cycles 3 and 4, the user of ELB device (FIG. 3, element 220) has not activated push-to-talk button (FIG. 3, element 73) during the receive intervals.

In the second scenario, illustrated at 92, the signal from ELB device (FIG. 3, element 220) is detected by a rescuer, and the rescuer transmits a message to the user of ELB device (FIG. 3, element 220). The second scenario 92 begins in a manner similar to the first scenario 90, where the emergency beacon sweeping tone, illustrated at 98, is transmitted by ELB device (FIG. 3, element 220) for the first 20 seconds of the first cycle 102, followed by transmission of the Manchester encoded digital version of the unit's serial number for approximately 0.1 seconds, as illustrated at 100. Next, at time 20.1 seconds, ELB device (FIG. 3, element 220) transmits a voice identification message of ELB device's serial number for approximately 5 seconds, as shown at 102. Upon completion of the transmission of the voice identification message at time 25 seconds, ELB device (FIG. 3, element 220) next broadcasts a message for approximately 5 seconds announcing to rescuers that ELB device (FIG. 3, element 220) is switching from transmit mode to receive mode, as illustrated at 104. Following the receive mode voice announcement 104, ELB device (FIG. 3, element 220) switches from transmit to receive mode for approximately 5 seconds, beginning at time 30 seconds, as shown at 106.

In this second scenario 92, the rescuer detects the signal from ELB device (FIG. 3, element 220), and sends a voice message to the user of the ELB device. As illustrated at 108 at time 35, after the user of ELB device (FIG. 3, element 220) receives the voice message from the rescuer and while the receive mode is still active, user activates push-to-talk button (FIG. 3, element 73) on ELB device (FIG. 3, element 220). After push-to-talk button (FIG. 3, element 73) is activated and released, the receive mode is automatically extended for an additional 30 seconds, as illustrated at 110. Thus, in the illustrated example, the receive mode remains active until time 65. The first transmit/receive cycle 112 of the second scenario 92 ends after the receive mode ends, at time 65. The second transmit/receive cycle 114 of the second scenario 92 begins at time 65. In the second and third transmit/receive cycles 114 and 116 of second scenario 92, no further activations of push-to-talk button (FIG. 3, element 73) take place while the receive mode is active. Thus, the second and third transmit/receive cycles 114 and 116 of second scenario 92 are of normal length (approximately 35 seconds).

In the third scenario, illustrated at 94, the receive mode within the transmit/receive cycle is lengthened by multiple activations of push-to-talk button (FIG. 3, element 73) while the receive mode is active. The third scenario 94 begins in a manner similar to first scenario 90 and second scenario 92, where the emergency beacon sweeping tone, illustrated at 98, is transmitted by ELB device (FIG. 3, element 220) for the first 20 seconds of the first cycle 102, followed by transmission of the Manchester encoded digital version of the unit's serial number for approximately 0.1 seconds, as illustrated at 100. Next, at time 20.1 seconds, ELB device (FIG. 3, element 220) transmits a voice identification message of the unit's serial number for approximately 5 seconds, as shown at 102. Upon completion of the transmission of the voice identification message at time 25 seconds, ELB device (FIG. 3, element 220) next broadcasts a message for approximately 5 seconds announcing to rescuers that the ELB device is switching from transmit mode to receive mode, as illustrated at 104. Following the receive mode voice announcement 104, ELB device (FIG. 3, element 220) switches from transmit to receive mode for approximately 5 seconds, beginning at time 30 seconds, as shown at 106.

In third scenario 94, the rescuer detects the signal transmitted by ELB device (FIG. 3, element 220), then sends a voice message to the user of the ELB device. As illustrated at 118 at time 35, after the user of ELB device (FIG. 3, element 220) receives the voice message from the rescuer and while the receive mode is still active, user activates push-to-talk button (FIG. 3, element 73) on the ELB device (FIG. 3, element 220). After push-to-talk button (FIG. 3, element 73) is activated and released, the receive mode is automatically extended for an additional 30 seconds, as illustrated at 120. Thus, in the illustrated example, activating and releasing push-to-talk button (FIG. 3, element 73) extends the receive mode from time 35 until time 65. However, in this scenario, the user of ELB device (FIG. 3, element 220) activates and releases push-to-talk button (FIG. 3, element 73) two more times during the extended receive mode, as shown at 120 and 122. Each subsequent activation and release of push-to-talk button (FIG. 3, element 73) while the ELB device (FIG. 3, element 220) is in receive mode automatically extends the receive mode for an additional 30 seconds beyond the new activation and release of the push-to-talk button. Thus, when push-to-talk button (FIG. 3, element 220) is activated and released at time 45, as illustrated at 120, the receive mode is extended an additional 30 seconds, such that the receive mode is now set to end at 75 seconds. When push-to-talk button (FIG. 3, element 220) is activated and released for the third time at time 65, as illustrated at 122, the receive mode is extended for an additional 30 seconds, such that the receive mode is now set to end at 95 seconds.

Thus, the first transmit/receive cycle 126 of the third scenario 94 finally ends after the third extension of the receive mode, at time 95 seconds. The second transmit/receive cycle 128 of the second scenario 94 begins at time 95. In the second transmit/receive cycles 128 of the second scenario 94, no further activations of push-to-talk button (FIG. 3, element 220) take place while the receive mode is active. Thus, the second transmit/receive cycle 128 is of normal length (approximately 35 seconds).

All time intervals described above are merely illustrative of one embodiment of the present invention. It is anticipated that in other embodiments of the present invention, time intervals will vary from those illustrated with no material change to the operation of the present invention.

In summary, the present invention describes an ELB device (FIG. 2, element 120) that transmits an identifying serial number in addition to the beacon signal. This transmission includes an audio modulated, digital encoded version of the serial number, and an analog, voice synthesized version of the serial number. In one embodiment, the ELB device (FIG. 3, element 220) incorporates a receiver that enables the user of the ELB device to enter into two-way, direct voice communication with a rescuer. The device also includes an automatic receive function which facilitates operation of the device by users not aware or not able to operate the device. In another embodiment, the ELB device includes inhibit signal generator (FIG. 3, element 78) and inhibit signal receiver (FIG. 3, element 81) which prevent non-emergency, ELB device to ELB device communication. In yet another embodiment, the present device incorporates a global positioning system (GPS) receiver (FIG. 3, element 74) which reads, processes and stores positioning information broadcast by GPS satellites, then broadcasts the GPS position information in conjunction with the aforementioned beacon signal and identifying serial number.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An emergency locator beacon (ELB) device comprising:

a memory having a unit identification stored therein;

a controller coupled to the memory, which controls operation of the ELB device;

a voice synthesizer coupled to the controller which translates the unit identification stored in the memory into a voice unit identification message;

an ELB antenna;

a transmitter coupled to the controller and the voice synthesizer, wherein the transmitter selectively broadcasts, via the ELB antenna, a locator beam signal, an audio modulated digital version of the unit identification, and the voice unit identification message; and a receiver coupled to the controller, wherein after transmission of the voice unit identification message, the controller automatically shuts off the transmitter and turns on the receiver for a predetermined time interval.

2. The ELB device of claim 1, wherein the ELB device transmits simultaneously on more than one frequency.

3. The ELB device of claim 2, wherein the more than one transmission frequencies include a 121.5 MHz frequency and a 243 MHz frequency.

4. The ELB device of claim 1, wherein the memory is a Programmable Read Only Memory (PROM).

5. The ELB device of claim 1, wherein the memory is an Erasable Programmable Read Only Memory (EPROM).

6. The ELB device of claim 1, wherein the selective broadcast is a plurality of repeatable cycles, with each of the cycles comprising: transmission of the locator beam signal for a predetermined time, followed by a transmission of the audio modulated digital version of the unit identification, followed by a transmission of the voice unit identification message.

7. The ELB device of claim 1, wherein the audio modulated digital version of the unit identification is of a Manchester encoded type.

8. The ELB device of claim 1, wherein the audio modulated digital version of the unit identification is encoded using a Non-Return to Zero (NRZ) encoding scheme.

9. The ELB device of claim 1, wherein the audio modulated digital version of the unit identification is encoded using a Dual Tone Multi-Frequency (DTMF) encoding scheme.

10. The ELB device of claim 1, wherein the device is powered by one or more batteries.

11. The ELB device of claim 10, wherein the one or more batteries are lithium batteries which yield an approximately 5 year shelf life.

12. The ELB device of claim 1, wherein the ELB device further includes a mechanism responsive to external stimulus for actuating the ELB device.

13. The ELB device of claim 1, wherein the ELB device further comprises:

a global positioning system (GPS) antenna which enables reception of GPS satellite information;

a GPS receiver coupled to the GPS antenna and the controller, wherein the GPS receiver receives the GPS satellite information; and a non-volatile memory coupled to the power supply, the GPS receiver, and the controller which stores positioning information from the GPS receiver.

14. The ELB device of claim 13, wherein the GPS positioning information is transmitted both digitally and by voice to a remote receiver.

15. An emergency locator beacon (ELB) device comprising:

a memory having a unit identification stored therein, a controller coupled to the memory, which controls operation of the ELB device;

a voice synthesizer coupled to the controller which translates the unit identification stored in the memory into a voice unit identification message;

an ELB antenna, a transmitter coupled to the controller and the voice synthesizer, wherein the transmitter selectively broadcasts, via the ELB antenna, a locator beam signal, an audio modulated digital version of the unit identification, and the voice unit identification message;

a receiver coupled to the controller and the ELB antenna which, in conjunction with the transmitter, provides a two-way voice communication capability between the ELB device and a remote transceiver;

a microphone coupled to the transmitter which enables a user of the ELB device to send an outgoing voice message;

a speaker coupled to the receiver, which enables the user of the ELB device to listen to an incoming voice message;

a transmission activation mechanism coupled to the controller which enables the user to activate the microphone for transmission of the outgoing voice message; and an inhibit signal generator coupled to the controller and the transmitter which generates a sub-audible tone, wherein the sub-audible tone inhibits direct communication with a second ELB device.

16. The ELB device of claim 15, wherein the transmission activation mechanism is a push-to-talk button.

17. The ELB device of claim 15, wherein the transmission activation mechanism is a voice activated switch (VOX).

18. The ELB device of claim 15, wherein the inhibit signal generator generates a 20 Hz tone.

19. The ELB device of claim 15, wherein the inhibit signal generator generates a digital word.

20. An emergency locator beacon (ELB) device comprising:

a memory having a unit identification stored therein;

a controller coupled to the memory, which controls operation of the ELB device;

a voice synthesizer coupled to the controller, which translates the unit identification stored in the memory into a voice unit identification message;

a transceiver coupled to the controller and the voice synthesizer which transmits a locator beam signal and the unit identification, and also provides a two-way voice communication capability between the ELB device and a remote transceiver;

a microphone coupled to the transceiver, which enables a user of the ELB device to send an outgoing voice message;

a speaker coupled to the transceiver which enables a user of the ELB device to listen to an incoming voice message;

a push-to-talk button coupled to the controller which enables the user to activate the microphone and the speaker for message transmission and reception, wherein the selective broadcast is a plurality of cycles, with each of the cycles comprising:

transmission of the locator beam signal for a first predefined period of time, followed by a transmission of the audio modulated digital version of the unit identification, followed by a transmission of the voice unit identification message, followed by a transmission of a receive mode notification message, followed by a switch from a transmit mode to a receive mode for a second predefined period of time.

21. The ELB device of claim 20, wherein the ELB device transmits simultaneously on more than one frequency.

22. The ELB device of claim 21, wherein the more than one transmission frequencies include a 121.5 MHz frequency and a 243 MHz frequency.

23. The ELB device of claim 20, wherein if the user depresses and releases the push-to-talk button while the ELB device is in the receive mode, the receive mode is extended for a third predefined period of time.

24. The ELB device of claim 20, wherein the ELB device further comprises:
 a global positioning system (GPS) antenna which enables reception of GPS satellite information;
 a GPS receiver coupled to the GPS antenna and the controller, wherein the GPS receiver receives the GPS satellite information;
 a non-volatile memory coupled to the GPS receiver and the controller, wherein the non-volatile memory stores positioning information from the GPS receiver.

25. The ELB device of claim 24, wherein the GPS positioning information is transmitted both digitally and by voice to a remote receiver.

26. The ELB device of claim 20, wherein the ELB device further comprises:
 an inhibit signal generator coupled to the controller and the transmitter, wherein the inhibit signal generator generates an inhibit signal which inhibits ELB device to ELB device direct communication.

27. The ELB device of claim 26, wherein the inhibit signal generator generates a 20 Hz tone.

28. The ELB device of claim 26, wherein the inhibit signal generator generates a digital word.

29. The ELB device of claim 20, wherein the ELB device further comprises:
 an inhibit signal detector coupled to the controller and the transmitter, wherein the inhibit signal detector detects an inhibit signal broadcast by another ELB device, and inhibits ELB device to ELB device direct communication.

30. A method for transmitting an emergency locator beacon (ELB) signal from an originating ELB transmitter to a remote receiver, wherein the transmission also includes a unit identification of the originating ELB transmitter, the method comprising the steps of:
 activating the originating ELB transmitter;
 reading a unit identification from a memory;
 translating the unit identification from the memory into an audio modulated digital version of the unit identification via a CPU, and translating the unit identification from the memory into a voice unit identification message via a voice synthesizer;
 transmitting the ELB signal, the audio modulated digital version of the unit identification, and the voice unit identification message to the remote receiver in a continuous, cyclic manner via a transmitter; and
 switching the transceiver to a receive mode of a predetermined time length between the transmission cycles.

31. The method of claim 30, wherein the ELB device transmits simultaneously on more than one frequency.

32. The method of claim 31, wherein the more than one transmission frequencies include a 121.5 MHz frequency and a 243 MHz frequency.

33. The method of claim 30, wherein the audio modulated digital version of the unit identification is of a Manchester encoded type.

34. The ELB device of claim 30, wherein the audio modulated digital version of the unit identification is encoded using a Non-Return to Zero (NRZ) encoding scheme.

35. The ELB device of claim 30, wherein the audio modulated digital version of the unit identification is encoded using a Dual Tone Multi-Frequency (DTMF) encoding scheme.

36. A method for transmitting an emergency signal from an originating emergency locator beacon (ELB) device to a remote receiver, wherein the transmission includes a locator beam signal and unit identification information, and further includes a two-way voice communication between the ELB device and the remote receiver, the method comprising the steps of:
 activating the originating ELB device;
 reading a unit identification from a memory;
 translating the unit identification from the memory into an audio modulated digital version of the unit identification via a CPU, and translating the unit identification from the memory into a voice unit identification message via a voice synthesizer; and
 transmitting the ELB signal, the audio modulated digital version of the unit identification, and the voice unit identification message to the remote receiver in a continuous, cyclic manner via a transceiver;
 switching the transceiver to a receive mode of a predetermined time length between the transmission cycles, wherein an operator at the remote receiver can transmit a voice message to the ELB device, and a user of the ELB device responds to the operator by activating a push-to-talk button and delivering the voice message.

37. The method of claim 36 wherein activation and release of a push-to-talk button during the receive mode extends the time length of the receive mode between transmission cycles.

38. The method of claim 36, further comprising the step of:
 broadcasting an inhibit signal, wherein the inhibit signal is a sub-audible tone which inhibits ELB device to ELB device direct communication.

39. The method of claim 36, further comprising the step of:
 broadcasting an inhibit signal, wherein the inhibit signal is a digital inhibit word which inhibits ELB device to ELB device direct communication.

40. The method of claim 36, further comprising the steps of:
 receiving a plurality of global positioning system (GPS) signals from multiple GPS satellites;
 processing the plurality of GPS signals, then generating a positional identifier; and
 sending both an audio modulated digital version of the positional identifier, and a voice synthesized translation of the positional identifier to a remote receiver via the transceiver.

* * * * *